US010543852B2

(12) United States Patent
Marcoux et al.

(10) Patent No.: US 10,543,852 B2
(45) Date of Patent: Jan. 28, 2020

(54) ENVIRONMENTAL DRIVER COMFORT FEEDBACK FOR AUTONOMOUS VEHICLE

(71) Applicant: Toyota Motor Engineering & Manufacturing North America, Inc., Erlanger, KY (US)

(72) Inventors: John H. Marcoux, Ypsilanti, MI (US); Miles J Johnson, Ann Arbor, MI (US); Danil V. Prokhorov, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 142 days.

(21) Appl. No.: 15/242,499

(22) Filed: Aug. 20, 2016

(65) Prior Publication Data
US 2018/0052461 A1 Feb. 22, 2018

(51) Int. Cl.
*B60W 50/08* (2012.01)
*B60W 50/14* (2012.01)

(52) U.S. Cl.
CPC ....... *B60W 50/14* (2013.01); *B60W 2050/146* (2013.01); *B60W 2600/00* (2013.01)

(58) Field of Classification Search
USPC .................................................. 701/23–28
See application file for complete search history.

(56) References Cited

U.S. PATENT DOCUMENTS

| 4,238,778 A * | 12/1980 | Ohsumi | G08G 1/0965 340/902 |
| 5,983,161 A * | 11/1999 | Lemelson | G01S 19/11 340/436 |
| 6,678,590 B1 * | 1/2004 | Burchfiel | G05D 1/0214 348/116 |
| 7,660,436 B2 * | 2/2010 | Chang | G06K 9/3241 382/104 |
| 7,667,581 B2 * | 2/2010 | Fujimoto | G06K 9/00369 340/425.5 |
| 7,831,407 B2 * | 11/2010 | Huang | B60W 40/09 303/20 |
| 8,108,147 B1 * | 1/2012 | Blackburn | G08G 1/166 235/454 |

(Continued)

OTHER PUBLICATIONS

Koo J., Kwac J., Ju W., Steinert M., Leifer L., & Nass C., "Why did my car just do that? Explaining semi-autonomous driving actions to improve driver understanding, trust and performance." in International Journal of Interactive Design and Manufacturing. Springer. Apr. 2014 in 7 pages.

*Primary Examiner* — Jonathan L Sample
(74) *Attorney, Agent, or Firm* — Christopher G. Darrow; Darrow Mustafa PC (57) ABSTRACT

Described herein is an autonomous vehicle comprising a sensor and a driver notification module in communication with the sensor. The driver notification module may be configured to receive first information related to an upcoming event; determine an action for an autonomous vehicle based, at least in part, on the first information; determine one or more characteristics of the action based, at least in part on the first information and a current status of the autonomous vehicle; determine a notification based, at least in part, on the action and the one or more characteristics; and deliver the notification within the autonomous vehicle.

20 Claims, 4 Drawing Sheets

(56) References Cited

U.S. PATENT DOCUMENTS

| | | | | |
|---|---|---|---|---|
| 8,112,225 B2* | 2/2012 | Eidehall | G01S 7/295 | 701/301 |
| 8,340,883 B2* | 12/2012 | Arbitmann | B60W 10/06 | 235/439 |
| 8,504,283 B2* | 8/2013 | Aso | G01S 13/726 | 280/735 |
| 8,552,886 B2* | 10/2013 | Bensoussan | B60Q 1/52 | 340/905 |
| 8,576,055 B2* | 11/2013 | Hara | G08G 1/166 | 340/435 |
| 8,589,061 B2* | 11/2013 | Bengtsson | G08G 1/16 | 701/301 |
| 8,676,491 B2* | 3/2014 | Taylor | B60C 23/0408 | 701/408 |
| 8,818,681 B1* | 8/2014 | Dolgov | G05D 1/0055 | 701/96 |
| 8,874,300 B2* | 10/2014 | Allard | H04L 67/12 | 700/245 |
| 8,948,955 B2* | 2/2015 | Zhu | G05D 1/0214 | 701/23 |
| 9,452,754 B2* | 9/2016 | Clarke | B60W 30/00 | |
| 9,493,118 B1* | 11/2016 | Laur | B60Q 9/008 | |
| 9,511,730 B1* | 12/2016 | Wu | G08G 1/166 | |
| 9,517,767 B1* | 12/2016 | Kentley | B60Q 1/26 | |
| 9,633,565 B2* | 4/2017 | Conrad | B60W 30/09 | |
| 9,725,036 B1* | 8/2017 | Tarte | B60Q 9/00 | |
| 9,804,599 B2* | 10/2017 | Kentley-Klay | G05D 1/0088 | |
| 9,805,423 B1* | 10/2017 | Konrardy | H04W 4/90 | |
| 9,975,379 B1* | 5/2018 | Gowda | B60W 50/14 | |
| 2002/0198632 A1* | 12/2002 | Breed | B60N 2/2863 | 701/1 |
| 2003/0014165 A1* | 1/2003 | Baker | G05D 1/104 | 701/3 |
| 2005/0060069 A1* | 3/2005 | Breed | B60N 2/2863 | 701/408 |
| 2007/0078600 A1* | 4/2007 | Fregene | G01S 13/9303 | 701/301 |
| 2007/0205875 A1* | 9/2007 | De Haan | H04M 1/575 | 340/425.5 |
| 2008/0147253 A1* | 6/2008 | Breed | B60W 30/16 | 701/3 |
| 2009/0074249 A1* | 3/2009 | Moed | G06K 9/00818 | 382/104 |
| 2009/0076702 A1* | 3/2009 | Arbitmann | B60W 10/06 | 701/96 |
| 2009/0184862 A1* | 7/2009 | Stayton | G08G 5/0008 | 342/30 |
| 2009/0326796 A1* | 12/2009 | Prokhorov | G08G 1/161 | 701/532 |
| 2010/0179760 A1* | 7/2010 | Petrini | G05D 1/101 | 701/301 |
| 2010/0305857 A1* | 12/2010 | Byrne | G06T 7/73 | 701/301 |
| 2011/0190972 A1* | 8/2011 | Timmons | G01C 21/34 | 701/31.4 |
| 2011/0210872 A1* | 9/2011 | Molander | G01S 5/16 | 340/961 |
| 2012/0029964 A1* | 2/2012 | Tengler | G06Q 10/1095 | 705/7.19 |
| 2012/0092208 A1* | 4/2012 | Lemire | G01S 13/87 | 342/29 |
| 2012/0126997 A1* | 5/2012 | Bensoussan | B60Q 1/52 | 340/905 |
| 2012/0143488 A1* | 6/2012 | Othmezouri | B60T 7/22 | 701/301 |
| 2014/0032049 A1* | 1/2014 | Moshchuk | B62D 15/0265 | 701/42 |
| 2014/0136044 A1* | 5/2014 | Conrad | B60W 30/09 | 701/23 |
| 2014/0136045 A1* | 5/2014 | Zhu | G05D 1/0214 | 701/23 |
| 2014/0139366 A1* | 5/2014 | Moses | G01S 13/9303 | 342/27 |
| 2015/0003669 A1* | 1/2015 | Solgi | G06K 9/3241 | 382/103 |
| 2015/0134226 A1* | 5/2015 | Palmer | B60W 40/10 | 701/101 |
| 2015/0160338 A1* | 6/2015 | Bageshwar | G01S 13/9303 | 342/29 |
| 2015/0166062 A1* | 6/2015 | Johnson | B60W 30/12 | 701/41 |
| 2015/0235092 A1* | 8/2015 | Mei | G06K 9/00805 | 382/103 |
| 2016/0003636 A1* | 1/2016 | Ng-Thow-Hing | H04N 7/188 | 701/26 |
| 2016/0125746 A1* | 5/2016 | Kunzi | G05D 1/0088 | 701/11 |
| 2016/0152180 A1* | 6/2016 | Kirsch | B60Q 9/00 | 701/36 |
| 2016/0167668 A1* | 6/2016 | Prokhorov | B60W 30/18009 | 701/23 |
| 2016/0216130 A1* | 7/2016 | Abramson | G01C 21/3626 | |
| 2016/0221500 A1* | 8/2016 | Sakai | B60Q 9/008 | |
| 2016/0272201 A1* | 9/2016 | Kang | G05D 1/00 | |
| 2016/0318442 A1* | 11/2016 | James | B60Q 9/00 | |
| 2016/0325753 A1* | 11/2016 | Stein | B60W 40/06 | |
| 2016/0334797 A1* | 11/2016 | Ross | G08G 1/20 | |
| 2016/0375767 A1* | 12/2016 | Konet | B60K 35/00 | 701/23 |
| 2016/0375900 A1* | 12/2016 | Laur | B60W 30/09 | 701/41 |
| 2017/0028987 A1* | 2/2017 | Yamada | B60W 50/08 | |
| 2017/0057507 A1* | 3/2017 | Gordon | B60W 30/16 | |
| 2017/0120804 A1* | 5/2017 | Kentley | G05D 1/0088 | |
| 2017/0124658 A1* | 5/2017 | Gordon | G06Q 40/08 | |
| 2017/0144596 A1* | 5/2017 | Wu | B60Q 1/323 | |
| 2017/0240096 A1* | 8/2017 | Ross | B60Q 1/50 | |
| 2017/0240098 A1* | 8/2017 | Sweeney | B60Q 1/2611 | |
| 2017/0254880 A1* | 9/2017 | Smith | G01S 13/86 | |
| 2017/0297588 A1* | 10/2017 | Doshi | B60W 50/14 | |
| 2017/0316696 A1* | 11/2017 | Bartel | G08G 1/202 | |
| 2018/0050704 A1* | 2/2018 | Tascione | B60W 50/0205 | |
| 2018/0093676 A1* | 4/2018 | Emura | G06K 9/00288 | |

\* cited by examiner

ENVIRONMENTAL DRIVER COMFORT FEEDBACK FOR AUTONOMOUS VEHICLE

TECHNICAL FIELD

The subject matter described herein relates in general to autonomous vehicles and, more particularly, to environmental driver comfort feedback for autonomous vehicles.

BACKGROUND

Autonomous vehicles react to the driving environment around them. Autonomous vehicles recognize traffic signs, traffic lights, and other surrounding objects. Sometimes the autonomous vehicle may stop, change lanes, swerve, or take other actions based on surrounding objects. The driver and/or occupants of the vehicle may be alarmed by sudden changes in the status of the vehicle if they are unaware of the upcoming change.

SUMMARY

In an embodiment herein, a driver notification module is described, the driver notification module comprising a memory, and a processor coupled to the memory. The processor may be configured to: receive first information related to an upcoming event; determine an action for an autonomous vehicle based, at least in part, on the first information; determine one or more characteristics of the action based, at least in part on the first information and a current status of the autonomous vehicle; determine a notification based, at least in part, on the action and the one or more characteristics; and deliver the notification within the autonomous vehicle.

In another embodiment herein, a method for driver notification is described. The method may comprise receiving, by a driver notification module, first information related to an upcoming event; determining, by the driver notification module, an action for an autonomous vehicle based, at least in part, on the first information; determining, by the driver notification module, one or more characteristics of the action based, at least in part on the first information and a current status of the autonomous vehicle; determining, by the driver notification module, a notification based, at least in part, on the action and the one or more characteristics; and delivering, by the driver notification module, the notification within the autonomous vehicle.

In another embodiment herein, an autonomous vehicle is described. The autonomous vehicle may comprise a sensor; and a driver notification module in communication with the sensor. The driver notification module may be configured to receive first information related to an upcoming event; determine an action for the autonomous vehicle based, at least in part, on the first information; determine one or more characteristics of the action based, at least in part on the first information and a current status of the autonomous vehicle; determine a notification based, at least in part, on the action and the one or more characteristics; and deliver the notification within the autonomous vehicle.

DETAILED DESCRIPTION

Described herein is a system and method for environmental driver comfort feedback for autonomous vehicles. When an autonomous vehicle is operating autonomously, the vehicle may be configured to recognize vehicle traffic, signs, traffic lights, road hazards, and other upcoming events. The vehicle operating autonomously may include any action taken by the vehicle that does not require driver intervention. Upcoming events may include any situation or object that the vehicle may encounter in the future. The autonomous vehicle may be configured to take an action based on the upcoming events. A driver and/or occupants of the vehicle may become uncomfortable if the vehicle takes an action unbeknownst to the driver and/or occupants. For example, if a vehicle is approaching a red light, the vehicle may recognize the red light and abruptly stop. The driver and/or occupants of the vehicle may be uncomfortable because they are unaware of the reason for the stop.

An autonomous vehicle may be configured with a driver notification system. The driver notification system may detect an upcoming event and determine a corresponding action for the upcoming event. The driver notification system may also determine characteristics of the action to be taken. For example, the driver notification may notify the driver that a red light has been detected and that the vehicle will be stopping shortly. The notification may be audible or visual or both. The notification may place the driver at ease when the action is taken.

Figure 1:
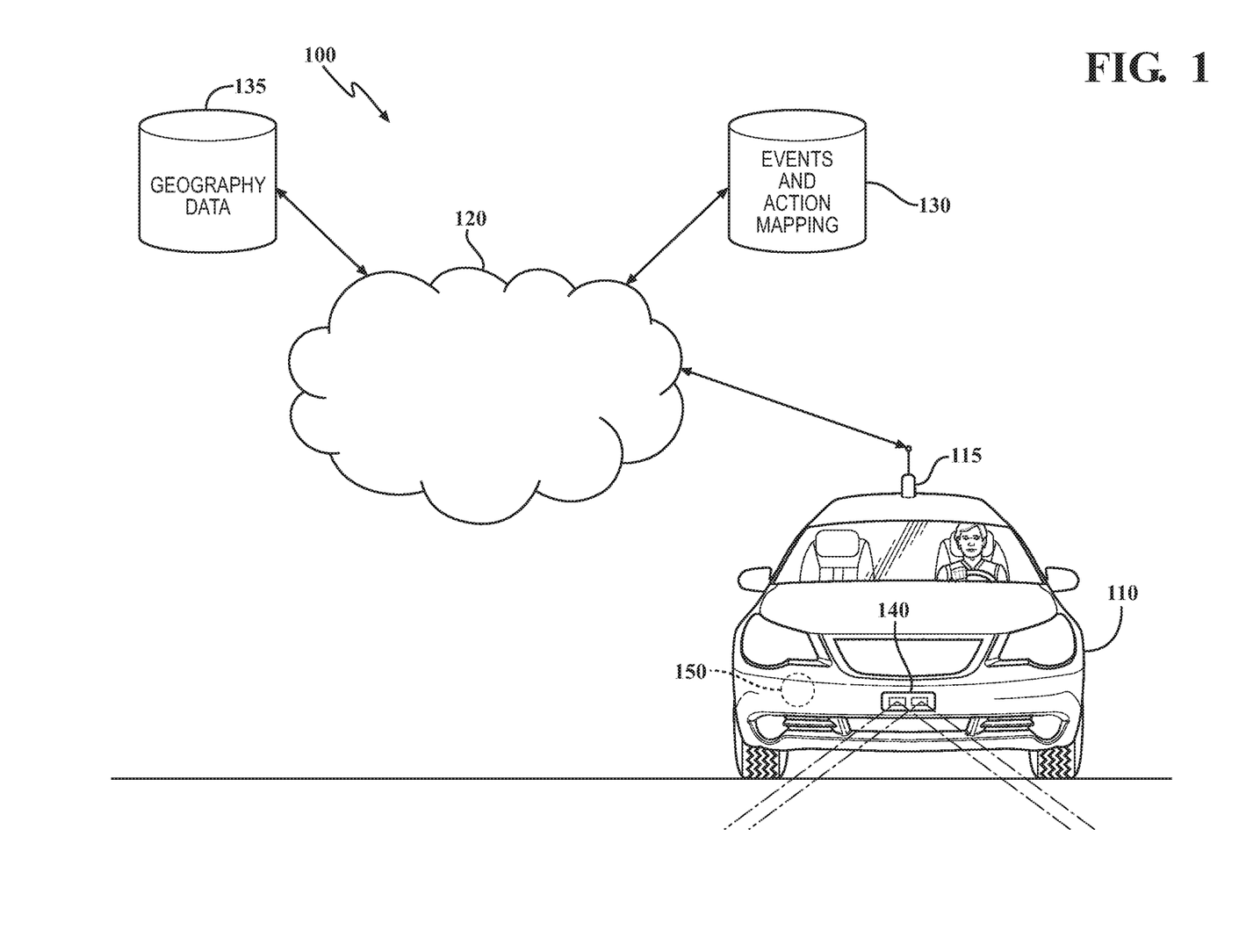
FIG. 1 is a diagram of an embodiment of a system for environmental driver comfort feedback.

FIG. 1 is a diagram of an embodiment of a system 100 for environmental driver comfort feedback. The system 100 may comprise a vehicle 110, an event and action database 130 and a geography data store 135. In some embodiments, the event and action database 130 and the geography data store 135 may be collocated or may be stored in separate locations. Vehicle 110 may communicate with the event and action database 130 and the geography data store 135 via the internet 120 using an antenna 115. Antenna 115 may be configured to communicate with the internet 120 using wireless communication. The event and action database 130 and the geography data store 135 may be part of cloud-based storage or some other data aggregation storage solution. The vehicle 110 may have a sensor 140 for sensing the area around the vehicle 110. Sensor 140 may be radar, LIDAR, a camera, and/or any other sensor for sensing the area around the vehicle 110. The vehicle 110 may also have a driver notification module 150. Driver notification module 150 may be a stand-alone module or may be part of another system within the vehicle 110.

The event and action database 130 may be a parameterized database that associates events that vehicle 110 may encounter to actions vehicle 110 may take in response to the event. The actions may be based on the type and/or severity of the event. The actions may be associated with a notification to be provided to driver and/or occupants of the vehicle. The notification may notify driver and/or occupants of the upcoming event and the action taken in response to the event. The notification may be a visual notification, an audio notification, or both.

The geography data store 135 may contain information related to geography vehicle 110 may encounter. The geography data store 135 may contain road maps, topography maps, traffic maps, traffic statistics, and other information that may be used by vehicle 110. Geography data store 135 may contain locations of traffic lights and other traffic control devices. Geography data store 135 and sensor 140 may be used alone or in combination to determine upcoming events that a driver may be notified of.

Figure 2:
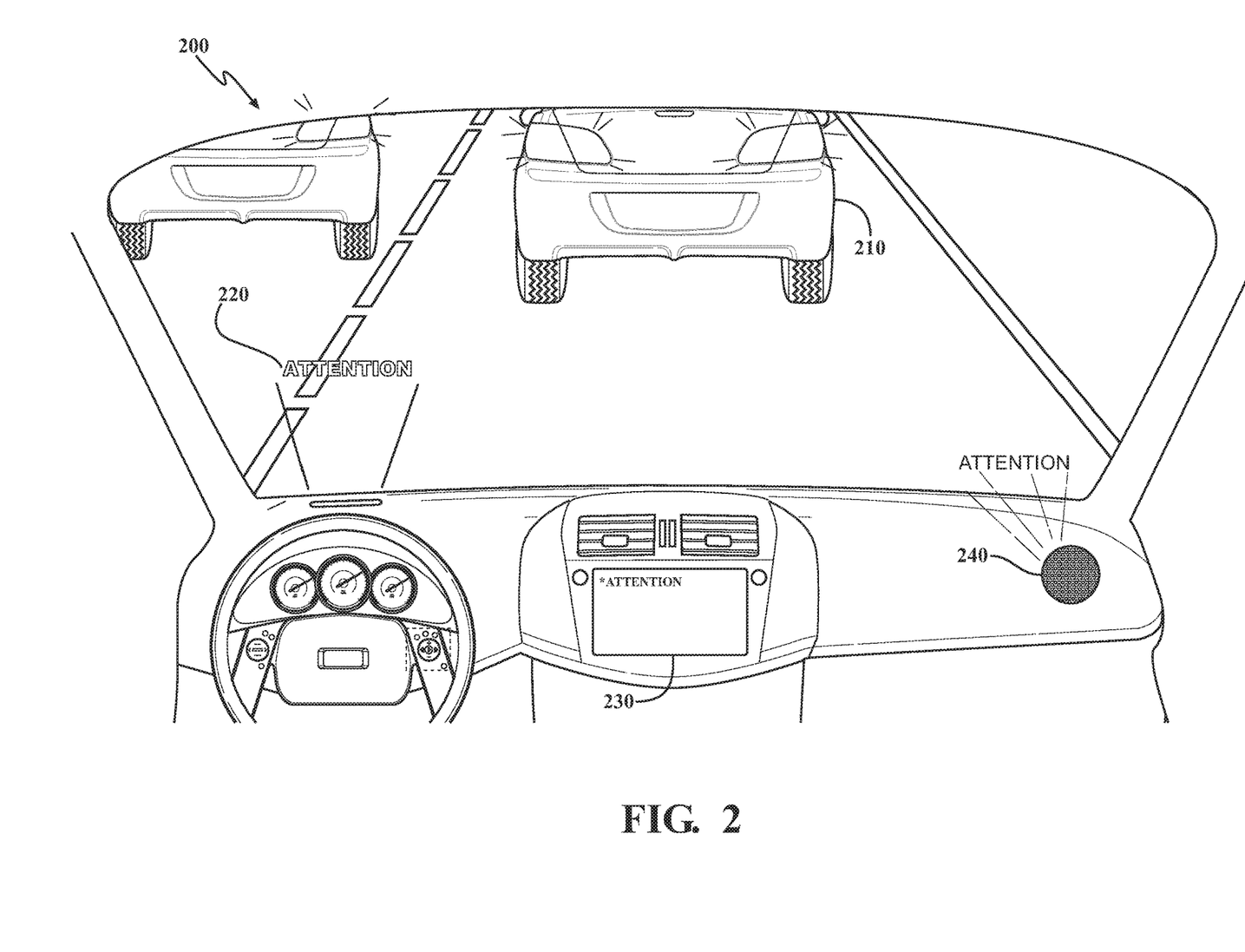
FIG. 2 is a diagram of an embodiment of a view from the interior of a vehicle.

FIG. 2 is a diagram of an embodiment of a view 200 from the interior of vehicle 110. Notifications of upcoming events and actions may be provided to the vehicle driver and/or occupants audibly and/or visually. In an embodiment an upcoming event 210 may be detected. In this case, the upcoming event 210 may be stopped traffic. Driver notification module 150 may determine the upcoming event 210 and a corresponding action. The driver notification module may then determine characteristics of the action and a phrase or alert that may be provided to driver and/or occupants of the vehicle. The phrase or alert may be provided visually via a heads-up-display (HUD) 220 and/or an in-dash display 230, and/or audibly via speaker 240. The in-dash display 230 may include one or more of a navigation system, entertainment system, instrument cluster, or some other display in the vehicle visible by the driver and/or occupants of the vehicle. In an embodiment, the HUD 220 may highlight the upcoming event. For example, the HUD 220 may project a box around an upcoming red light.

Figure 3:
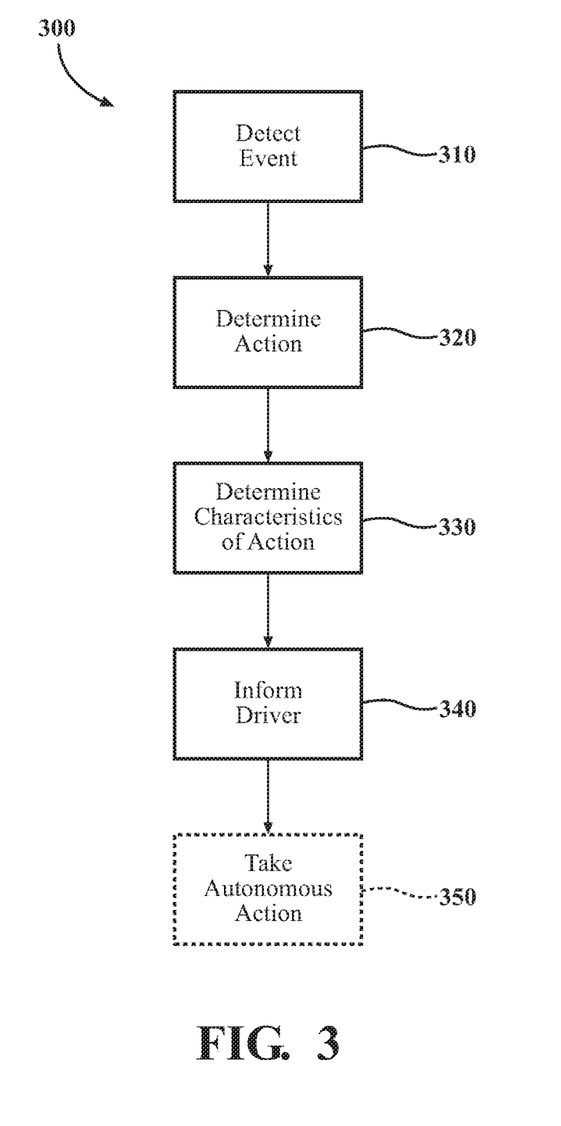
FIG. 3 is a flow diagram of an embodiment of a method for environmental driver comfort feedback.

FIG. 3 is a flow diagram of an embodiment of a method 300 for environmental driver comfort feedback. Method 300 may begin at block 310 when an upcoming event is detected by a vehicle, e.g., vehicle 110. Upcoming events may be any situation that the vehicle 110 may encounter that causes the vehicle 110 to change its current operating status. Examples of upcoming events include, but are not limited to: traffic signals, traffic hazards, bicyclists, stopped traffic, potholes, etc.

The upcoming event may be detected using data from a sensor, e.g., sensor 140, data from a geography data store, e.g., geography data store 135, other data sources, or any combination thereof. For example, sensor 140 may comprise a camera and may capture an image of a bicyclist on the shoulder of the road ahead of the vehicle. As another example, driver notification module 150, may interact with geography data store 135 to determine a sharp curve in the upcoming road. As yet another example, sensor 140 may detect a pothole in the road and the location of the detected pothole may be correlated with a location of the pothole from geography data store 135.

After an upcoming event is detected, the method may continue at block 320 where an action that corresponds to the event may be detected. The action may be any action that causes the vehicle to change its current operating status. Examples of actions include, but are not limited to deceleration, swerving, stopping lane changing, accelerating, activating a turn signal, etc.

Driver notification module 150 may interact with the event and actions database 130 to determine actions that correspond to the upcoming event. For example, an action associated with the bicyclist on the shoulder of the road ahead of the vehicle may include a lane shift. As another example, an action associated with the sharp curve in the upcoming road may include deceleration of the vehicle. As yet another example, an action associated with the pothole in the road may include the vehicle swerving to avoid the pothole.

After an action is determined, the method may continue at block 330 where characteristics of the action may be determined. The characteristics of the action may be determined based upon the upcoming event and/or the determined action. Examples of characteristics of the action include, but are not limited to intensity of the action, duration of the action, time until the action occurs, etc.

Driver notification module 150 may interact with the event and actions database 130 to determine characteristics of the action. For example, characteristics of a lane shift may include identifying which lane the vehicle will shift to and/or when the shift will occur. As another example, characteristics of deceleration may include identifying how much velocity will decrease as a result of the deceleration, the duration of the deceleration, and/or identifying when the deceleration will begin. As yet another example, characteristics of swerving may include direction of the swerve, intensity of the swerve, and/or when the swerve will occur.

After an action and characteristics of the action have been determined, the method may continue at block 340 where the driver and/or occupants of the vehicle may be notified. The driver notification module 150 may create a notification by retrieving a notification previously stored in a database, e.g., event and actions database 130. The driver notification module 150 may create the notification using a text to speech generator and the previously determined action and characteristics of the action. Creating the notification may include other actions taken by the driver notification module 150 to provide the vehicle occupants with information related to the action and/or characteristics of the action. The notification may include the upcoming event, the action, and/or characteristics of the action. The notification may be provided audibly and/or visually. The notification may be provided via any combination of HUD 220, in-dash display 230, or speaker 240.

Driver notification module 150 may interact with vehicle systems to provide the notification. For example, the driver notification module 150 may cause the notification "bicyclist ahead, the vehicle will change to the left lane in 35 seconds" to be displayed and played to the driver and/or vehicle occupants. As another example, the driver notification module 150 may cause the notification "sharp curve ahead, the vehicle will be decelerating to 25 miles per hour" to be displayed and played to the driver and/or vehicle occupants. As yet another example, the driver notification module 150 may cause the notification "pothole ahead, the vehicle will be swerving to the right in 400 feet" to be displayed and played to the driver and/or vehicle occupants.

After the driver and/or occupants of the vehicle are notified, the method may continue at step 350, where the vehicle takes the action described in the notification. In some embodiments, this step is optional, e.g., the driver may take control of the vehicle or the vehicle may determine autonomous driving is no longer possible based upon the event.

Figure 4:
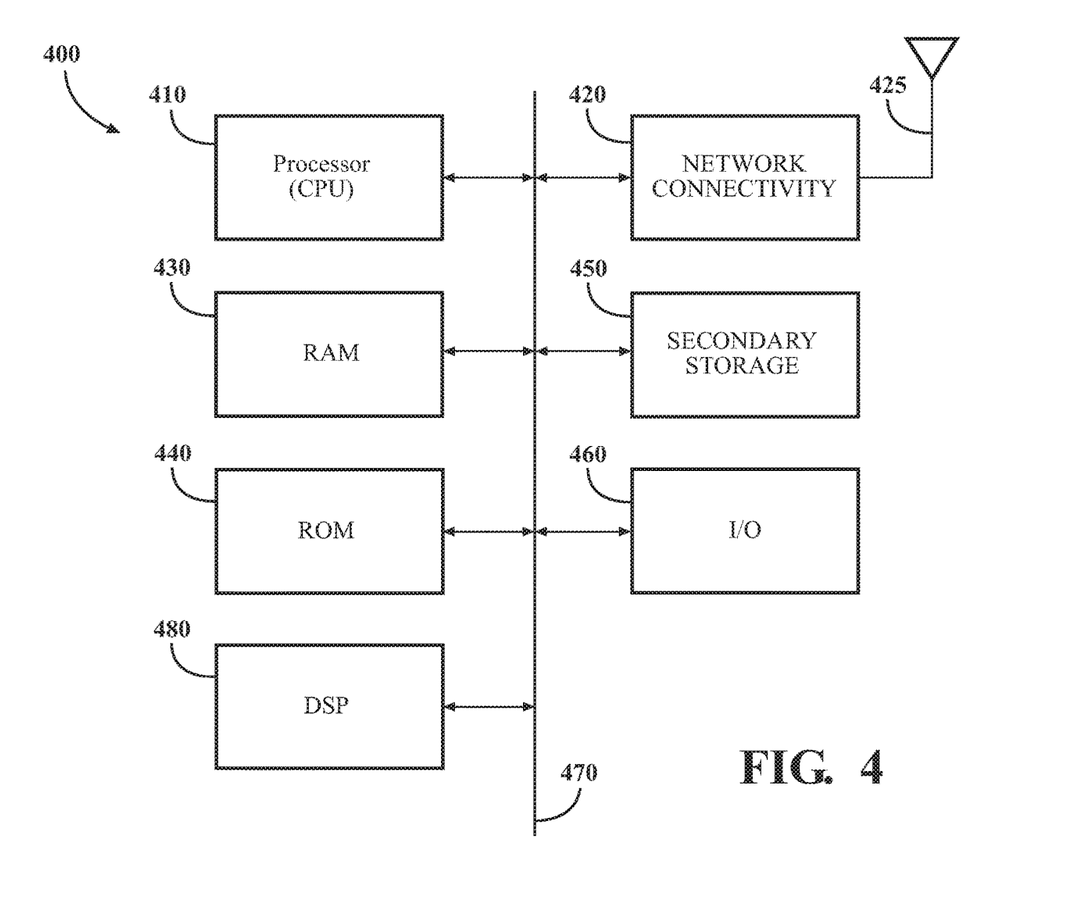
FIG. 4 is a block diagram of an embodiment of a system for environmental driver comfort feedback for autonomous vehicles.

FIG. 4 illustrates an example of a system 400 that includes a processor 410 suitable for implementing one or more embodiments disclosed herein. The processor 410 may control the overall operation of the device. In an embodiment, the system 400 may be configured as a driver notification module 150. System 400 may be part of vehicle 110 comprising the driver notification module 150.

In addition to the processor 410 (which may be referred to as a central processor unit or CPU), the system 400 might include network connectivity devices 420, random access memory (RAM) 430, read only memory (ROM) 440, secondary storage 450, and input/output (I/O) devices 460. These components might communicate with one another via a bus 470. In some cases, some of these components may not be present or may be combined in various combinations with one another or with other components not shown. These components might be located in a single physical entity or in more than one physical entity. Any actions described herein as being taken by the processor 410 might be taken by the processor 410 alone or by the processor 410 in conjunction with one or more components shown or not shown in the drawing, such as a digital signal processor (DSP) 480. Although the DSP 480 is shown as a separate component, the DSP 480 might be incorporated into the processor 410.

The processor 410 executes instructions, codes, computer programs, or scripts that it might access from the network connectivity devices 420, RAM 430, ROM 440, or secondary storage 450 (which might include various disk-based systems such as hard disk, floppy disk, or optical disk). While only one CPU 410 is shown, multiple processors may be present. Thus, while instructions may be discussed as being executed by a processor, the instructions may be executed simultaneously, serially, or otherwise by one or multiple processors. The processor 410 may be implemented as one or more CPU chips and may be a hardware device capable of executing computer instructions. In an embodiment, the processor 410 may be configured to execute instructions that cause a driver notification module to perform the method of FIG. 3.

The network connectivity devices 420 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 420 may enable the processor 410 to communicate with the Internet or one or more telecommunications networks or other networks from which the processor 410 might receive information or to which the processor 410 might output information. The network connectivity devices 420 might also include one or more transceiver components 425 capable of transmitting and/or receiving data wirelessly.

The RAM 430 might be used to store volatile data and perhaps to store instructions that are executed by the processor 410. The ROM 440 is a non-volatile memory device that typically has a smaller memory capacity than the memory capacity of the secondary storage 450. ROM 440 might be used to store instructions and perhaps data that are read during execution of the instructions. Access to both RAM 430 and ROM 440 is typically faster than to secondary storage 450. The secondary storage 450 is typically comprised of one or more disk drives or tape drives and might be used for non-volatile storage of data or as an over-flow data storage device if RAM 430 is not large enough to hold all working data. Secondary storage 450 may be used to store programs that are loaded into RAM 430 when such programs are selected for execution.

The I/O devices 460 may include liquid crystal displays (LCDs), touch screen displays, keyboards, keypads, switches, dials, mice, trackballs, voice recognizers, card readers, paper tape readers, printers, video monitors, or other well-known input/output devices. Also, the transceiver 425 might be considered to be a component of the I/O devices 460 instead of or in addition to being a component of the network connectivity devices 420.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium.

What is claimed is:

1. A driver notification module comprising:
a memory; and
a processor coupled to the memory, the processor configured to:
receive first information related to an upcoming event;
determine an action for an autonomous vehicle based, at least in part, on the first information;
determine one or more characteristics of the action based, at least in part on the first information and a current status of the autonomous vehicle;
create a notification based, at least in part, on the action and the one or more characteristics; and
deliver the notification within the autonomous vehicle to improve a situational awareness of occupants in relation to an environment around the autonomous vehicle.

2. The driver notification module of claim 1, wherein the first information is received from one of a sensor of the autonomous vehicle or a geography data store.

3. The driver notification module of claim 1, wherein the processor is further configured to:
receive second information related to the upcoming event, wherein the first information is received from a sensor of the autonomous vehicle and the second information is received from a geography data store;
determine the action for the autonomous vehicle based, at least in part, on the first information and the second information; and
determine the one or more characteristics of the action based, at least in part on the first information, the second information, and a current status of the autonomous vehicle.

4. The driver notification module of claim 1, wherein at least a portion of the notification is retrieved from a database, the database configured to map the one or more characteristics to the portion of the notification.

5. The driver notification module of claim 4, wherein the database is further configured to map the one or more characteristics to the action.

6. The driver notification module of claim 1, wherein the action is related to a change in a current operating status of the autonomous vehicle.

7. A method for driver notification, the method comprising:
receiving, by a driver notification module, first information related to an upcoming event;
determining, by the driver notification module, an action for an autonomous vehicle based, at least in part, on the first information;
determining, by the driver notification module, one or more characteristics of the action based, at least in part on the first information and a current status of the autonomous vehicle;
creating, by the driver notification module, a notification based, at least in part, on the action and the one or more characteristics; and
delivering, by the driver notification module, the notification within the autonomous vehicle to improve a situational awareness of occupants in relation to an environment around the autonomous vehicle.

8. The method of claim 7, wherein receiving the first information comprises receiving the first information from one of a sensor of the autonomous vehicle or a geography data store.

9. The method of claim 7 further comprising:
receiving second information related to the upcoming event, wherein the first information is received from a sensor of the autonomous vehicle and the second information is received from a geography data store;
determining the action for the autonomous vehicle based, at least in part, on the first information and the second information; and
determining the one or more characteristics of the action based, at least in part on the first information, the second information, and a current status of the autonomous vehicle.

10. The method of claim 7 further comprising:
retrieving at least a portion of the notification from a database, the database configured to map the one or more characteristics to the portion of the notification.

11. The method of claim 10, wherein the database is further configured to map the one or more characteristics to the action.

12. The method of claim 7, wherein the action is related to a change in a current operating status of the autonomous vehicle.

13. An autonomous vehicle comprising:
a sensor; and
a driver notification module in communication with the sensor, the driver notification module configured to:
receive first information related to an upcoming event;
determine an action for the autonomous vehicle based, at least in part, on the first information;
determine one or more characteristics of the action based, at least in part on the first information and a current status of the autonomous vehicle;
create a notification based, at least in part, on the action and the one or more characteristics; and
deliver the notification within the autonomous vehicle to improve a situational awareness of occupants in relation to an environment around the autonomous vehicle.

14. The autonomous vehicle of claim 13, wherein the first information is received from one of the sensor or a geography data store.

15. The autonomous vehicle of claim 13, wherein the driver notification module is further configured to:
receive second information related to the upcoming event, wherein the first information is received from the sensor and the second information is received from a geography data store;
determine the action for the autonomous vehicle based, at least in part, on the first information and the second information; and
determine the one or more characteristics of the action based, at least in part on the first information, the second information, and a current status of the autonomous vehicle.

16. The autonomous vehicle of claim 13, wherein at least a portion of the notification is retrieved from a database, the database configured to:
map the one or more characteristics to the portion of the notification; and
map the one or more characteristics to the action.

17. The autonomous vehicle of claim 13, wherein the action is related to a change in a current operating status of the autonomous vehicle.

18. The driver notification module of claim 1, wherein the processor is further configured to create the notification based, at least in part, on the action, the one or more characteristics, and the upcoming event.

19. The method of claim 7, wherein creating the notification comprises:
   creating the notification based, at least in part, on the action, the one or more characteristics, and the upcoming event.

20. The autonomous vehicle of claim 13, wherein the driver notification module is further configured to create the notification based, at least in part, on the action, the one or more characteristics, and the upcoming event.

* * * * *